J. H. BROWN.
Toy-Sled.
No. 56,358 
Patented July 17, 1866.
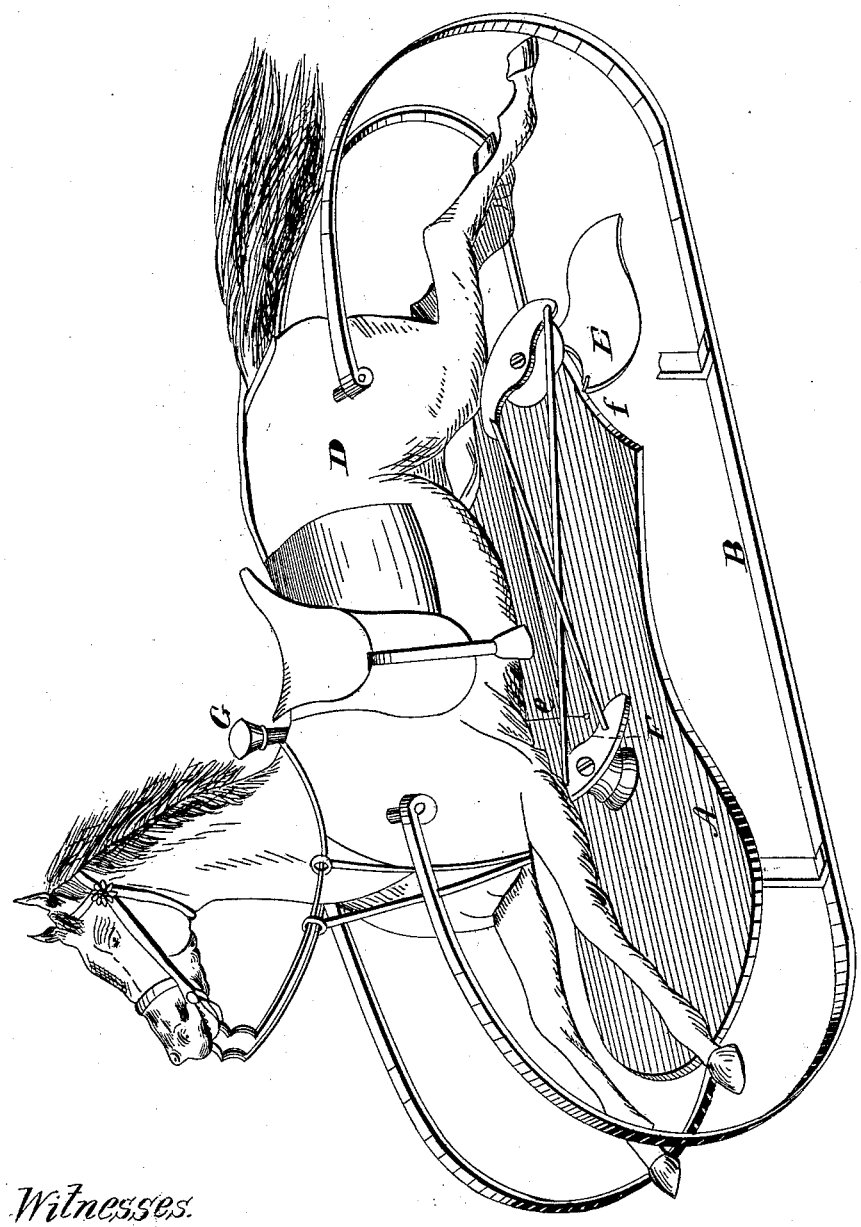
Witnesses.
Inventor
John H Brown

UNITED STATES PATENT OFFICE.

JOHN H. BROWN, OF NEW YORK, N. Y.

IMPROVEMENT IN TOY SLEDS.

Specification forming part of Letters Patent No. 56,358, dated July 17, 1866.

*To all whom it may concern:*

Be it known that I, JOHN H. BROWN, of the city, county, and State of New York, have invented a new and Improved Toy Sled; and I do hereby declare that the following is a full, clear, and exact description thereof, which will enable others skilled in the art to make and use the same, reference being had to the accompanying drawing, forming part of this specification.

The drawing represents a perspective view of this invention.

This invention consists in the arrangement of the figure of a horse or other suitable animal with the runners of a sled in such a manner that a sled of a novel and interesting appearance is obtained, which will be preferred by children to sleds of the ordinary form and construction.

It consists, further, in hanging the figure of the horse or other animal to springs formed by the ends of the runners of a sled in such a manner that said horse or other figure is free to accommodate itself to the motions of the rider and a convenient and yielding sled is obtained.

It consists, finally, in combining, with the horse or other figure and with the sled, a steering device and a brake, the steering device being operated by the feet and the brake by pulling a button rising in front of the saddle, in such a manner that the rider has perfect control over the motions of the sled without leaving the saddle.

A represents a sled of that class which are generally used by boys for coasting or going down over the slope of a hill. The runners B of this sled are made to turn up in the form of C-springs, and from their ends is suspended a horse, D. Instead of a horse, however, the figure of any other animal might be substituted, and said figure might be connected to the platform of the sled, or it might be combined with the runners B in any other suitable manner besides that shown in the drawing. I prefer to suspend it from the spring-shaped ends of the runners, however, so as to obtain a yielding seat, which is more comfortable than it would be if the horse or other figure should be rigidly attached to the platform of the sled or to the runners.

To the rear end of the platform of the sled is connected a rudder, E, which is operated by a foot-lever, F, pivoted to said platform under the horse, in a convenient position for the feet of the rider, and said rudder also serves as a brake, which purpose is accomplished by hanging the same in such a manner that it has a double motion—one by turning it so that it sweeps over the ground and governs the direction in which the sled is to run, and one by turning its point down on the ground, so that it acts as a brake, whereby the velocity of the sled can be checked or its motion stopped.

The brake is operated by a button which projects from the back of the horse, in front of the saddle, and which connects by rods $e\,f$ with the rudder E. By raising the button the rear end or point of the rudder is depressed on the ground and the brake is applied.

By this arrangement a sled is obtained which readily attracts the attention of the public on account of its novel appearance, and which is comfortable for the rider, and very easy and convenient in its operation.

What I claim as new, and desire to secure by Letters Patent, is—

The combination of the button G, rods $e\,f$, and rudder E, arranged with the horse D and sled A, and operating in the manner and for the purpose herein specified.

JOHN H. BROWN.

Witnesses:
 M. M. LIVINGSTON,
 ALEX. F. ROBERTS.